United States Patent [19]

Balkau et al.

[11] 4,102,608
[45] Jul. 25, 1978

[54] RECIPROCATORY PISTON AND CYLINDER MACHINES

[75] Inventors: Guenter Karl Willi Balkau, Springvale; Eckhard Bez, Moorabbin; John Lascelles Farrant, North Balwyn, all of Australia

[73] Assignee: Commonwealth Scientific and Industrial Research Organization, Campbell, Australia

[21] Appl. No.: 753,382

[22] Filed: Dec. 22, 1976

[30] Foreign Application Priority Data

Dec. 24, 1975 [AU] Australia .............................. 4394/75
Feb. 26, 1976 [AU] Australia .............................. 5014/76

[51] Int. Cl.² .............................................. F04B 49/00
[52] U.S. Cl. ...................................... 417/242; 92/193; 277/205
[58] Field of Search .................... 417/242, 491, 423

[56] References Cited
U.S. PATENT DOCUMENTS 1,298,112 3/1919 Sowder ................................. 417/242

FOREIGN PATENT DOCUMENTS 481,072 3/1975 Australia.

Primary Examiner—Carlton R. Croyle
Assistant Examiner—R. E. Gluck
Attorney, Agent, or Firm—Sughrue, Rothwell, Mion, Zinn and Macpeak

[57] ABSTRACT

Vacuum pump of reciprocating piston and cylinder type. Cylinder is stepped to have front large diameter portion and rear small diameter portion. Piston has enlarged head portion sliding in front portion of cylinder and rear portion sliding in rear portion of cylinder. Front end of cylinder is closed to form high vacuum pumping chamber swept by front face of piston head. Gas enters the high vacuum pumping chamber through side wall of cylinder and can be exhausted through exhaust valve in closed front end of cylinder. Rear annular face of piston head sweeps lower vacuum chamber in cylinder behind the piston head. A gas transfer passage extends through cylinder wall from front end of high vacuum pumping chamber to port in cylinder wall so as to transfer gas from high vacuum chamber to lower vacuum chamber when piston approaches end of forward stroke. Gas is transferred through transfer duct at pressures lower than required to open the exhaust valve.

Also claimed are specific forms of piston ring permitting lubrication-free operation of piston in the cylinder.

23 Claims, 7 Drawing Figures

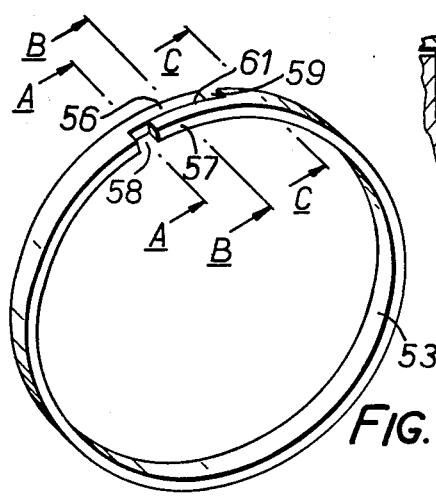
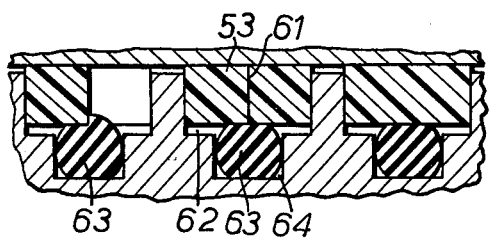
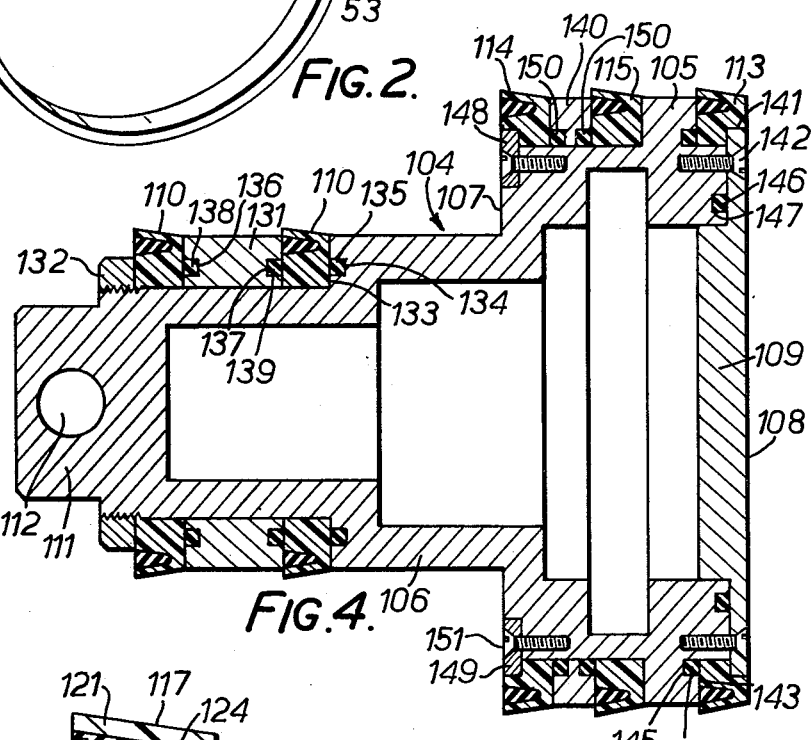
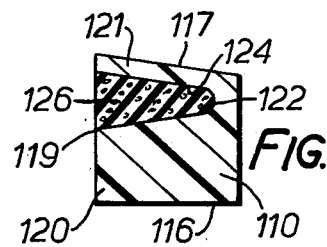
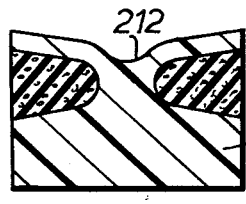
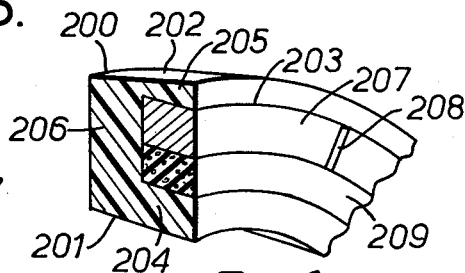

RECIPROCATORY PISTON AND CYLINDER MACHINES

BACKGROUND OF THE INVENTION

This invention relates to reciprocatory piston and cylinder machines. It is particularly applicable to vacuum pumps of the piston and cylinder type which can operate without use of a lubricating or sealing liquid and which can be used as backing pumps for electron microscopes.

At present almost all electron microscopes are equipped with pumping systems based on oil diffusion pumps backed by oil-filled rotary mechanical pumps of the vane type. Consequently, a considerable part of the residual gas in the columns of these instruments is contributed by molecules of oil and fragments of oil molecules, so a contaminating layer of carbonaceous material is deposited on the specimen and on all surfaces irradiated by the electron beam. The contamination of the specimen can be substantially reduced by surrounding it with a liquid nitrogen cooled trap and this practice is widely adopted.

The problem of contamination in electron microscopes could best be avoided by the use of oil-free pumps. Most previous attempts to produce oil-free pumps have involved modifications of the rotary type pumps and have been unsuccessful but Australian Pat. No. 481,072 does disclose a pump of the reciprocating piston and cylinder type which is capable of producing high vacuum conditions without the use of lubricating and sealing oil. However, the vacuum which can be achieved with a piston and cylinder type of pump operating under oil-free conditions is limited by difficulties in sealing against gas leakage into the working spaces of the pump and, in conventional constructions, by the need to have valves which need to be subjected to gas pressure to open. The vacuum that can be produced in the high vacuum stage of a multi-stage pump can then be determined by the pressure required to open an exhaust valve in that stage of the pump. The present invention enables alleviation of these difficulties.

SUMMARY OF THE INVENTION

According to one aspect, the invention provides a vacuum pump comprising:
a cylinder having a first portion closed at one end and a second portion contiguous with, but of smaller diameter than, the first portion;
a piston having a head portion slidable in the first cylinder portion and a second piston portion of smaller diameter than the head portion and slidable in the second cylinder portion, said piston head portion having a front face facing the closed cylinder end and an annular back face;
a gas inlet for inlet of gas to the interior of the first cylinder portion between the front face of the piston head portion and the closed cylinder end on reciprocation of the piston;
a first exhaust duct for exhaustion of gas from the interior of the first cylinder portion ahead of the piston head portion by pumping action of the front face of the piston head portion;
a one-way valve in said first exhaust duct operable by gas pressure thereon to permit exhaustion of gas from the interior of the first cylinder portion ahead of the piston head portion but closable against reverse gas flow;
a second exhaust duct for exhaustion of gas from the interior of the first cylinder portion behind the piston head portion by pumping action of the back face of the piston head portion; and
a gas transfer passage for transfer of gas from said interior of the first cylinder portion ahead of the piston head portion to the interior of the first cylinder portion behind the piston head portion by pumping action of the front face of the piston head which gas transfer passage is capable of said transfer of gas at gas pressures lower than required to open said one-way valve.

Preferably, the first exhaust duct communicates with the interior of the first cylinder portion ahead of the piston head portion through said one end of the cylinder and the one-way valve is located in the inlet end of that duct so as to be subjected to the gas pressure within the interior of the first cylinder portion ahead of the piston head portion throughout all movements of the piston.

Preferably further, the gas transfer passage is a permanently unrestricted passage formed in the cylinder wall so as to communicate at one end with said interior of the first cylinder portion at the closed end of that cylinder portion and to communicate at its other end with a port located in the cylinder wall such that it is closed by the piston against escape of gas from the transfer passage into the first cylinder portion behind the piston head portion except when the piston is closely adjacent the closed cylinder end, when it provides communication with the first cylinder portion behind the piston head portion. The total volume of the transfer passage may be less than 5% of the piston swept volume of the first cylinder portion ahead of the piston head portion.

In any reciprocatory piston and cylinder machine which is to operate without cylinder lubrication a major problem arises in the provision of sliding seals for the piston/cylinder interface. The invention further provides novel types of seals which have proved most reliable in service and have allowed most effective sealing to be maintained over extended periods of operation.

Specifically the invention further provides a reciprocatory piston and cylinder machine comprising a cylinder, a piston slidable back and forth within the cylinder and at least one sealing ring extending circumferentially about the piston and providing a sliding seal between the piston and the cylinder, wherein said sealing ring is split so as to have free ends which fit together, said free ends are notched one to each side of the ring such that they overlap to form between them an interface extending circumferentially of the ring and the ring is held against the surface on which it slides by means of an endless resilient ring extending circumferentially of the ring and covering a radial extremity of said interface.

The invention also extends to a piston ring for a reciprocatory piston and cylinder machine and formed as a circumferentially continuous ring having a generally cylindrical outer peripheral surface and adjacent that outer surface an annular groove in one side of the ring to divide the ring into an inner portion and an outer peripheral skirt portion which is integrally connected to the inner portion at the root of the groove and is capable of flexure laterally of the groove.

In order that the invention may be more fully explained, one particular pump and various sealing ring constructions will be described with reference to the accompanying drawings.

BRIEF DESCRIPTION OF THE DRAWINGS

FIG. 2 is a perspective view of a sealing ring of the vacuum pump;

FIG. 3 is a scrap cross-section through part of a cylinder and piston of the pump;

FIG. 4 is a cross-section of a modified pump piston fitted with differently constructed piston rings;

FIG. 5 is a cross-section through part of one of the piston rings shown in FIG. 4;

FIG. 6 is a partly sectioned scrap view illustrating a further piston ring arrangement; and FIG. 7 is a cross-section through part of a still further type of piston ring.

DESCRIPTION OF THE PREFERRED EMBODIMENT

Figure 1:
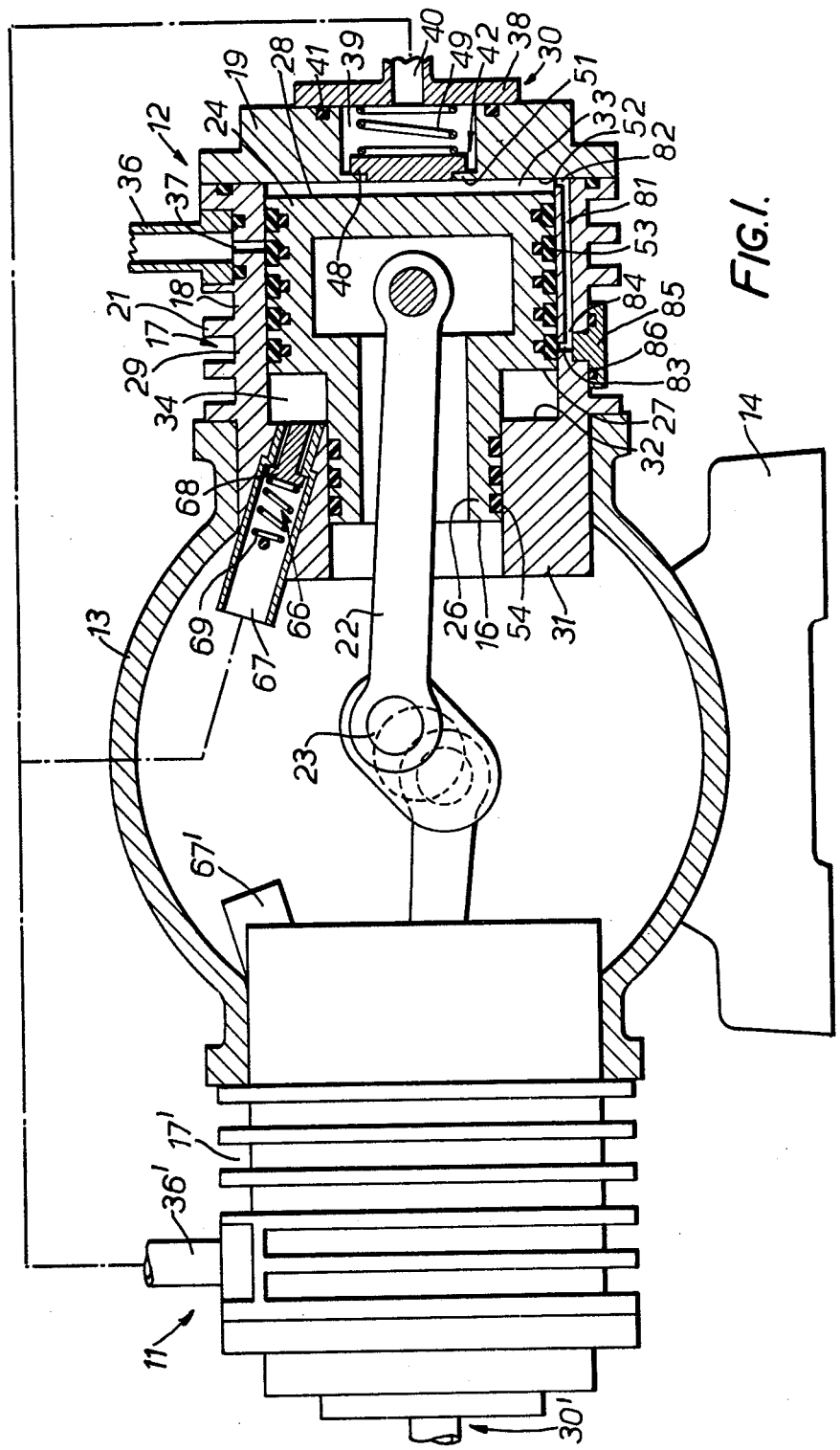
FIG. 1 is a partly sectioned elevation of a multistage vacuum pump constructed in accordance with the invention.

The vacuum pump illustrated in FIGS. 1 to 3 comprises a pair of pump units 11, 12 mounted one at either side of a central crankcase 13 supported on a pedestal 14. Pumping units 11, 12 are of similar construction, unit 12 providing two high vacuum stages and unit 11 providing two backing stages. Each unit comprises a piston, denoted as 16 in pumping unit 12, which reciprocates within a cylinder 17 and, in each case, cylinder 17 has a peripheral wall 18, a cylinder end 19 and external cooling fins 21.

The two pistons of pumping units 11, 12 are connected by means of crank arms 22 to a common crankshaft 23 which extends through crankcase 13 and is connected to an electric drive motor (not shown). Crankshaft 23 has two cranks of mutually opposite eccentricities so that the pistons of the two pump units are reciprocated in opposition to one another.

Details of the construction of pumping unit 12 can be seen in the right-hand side of FIG. 1. As shown, piston 16 and cylinder 17 are both of stepped configuration. More particularly, piston 16, which is hollow, has a relatively large diameter head portion 24 and a smaller diameter rear skirt portion 26 so that an annular piston face 27 is defined at the rear of the head portion directed oppositely to the main piston face 28. Cylinder 17 has a relatively large diameter portion 29 within which the head portion of the piston slides and a smaller diameter portion 31 to receive the skirt portion 26 of the piston. An annular shoulder 32 is defined in the cylinder between cylinder portions 29, 31 in opposition to the annular piston face 27. Thus, a differential piston arrangement is provided whereby the cylinder has a front cylindrical working space 33 and a rear annular working space 34.

Each cylinder 17 has a tubular inlet 36 which provides communication with the interior of the cylinder through a set of inlet ports 37 extending through the peripheral wall of the cylinder at a location such that they are exposed only when the piston is near bottom dead centre but are covered by the piston during the greater part of the movement of the piston.

Each pumping unit 11, 12 has a gas outlet 30 fitted to its cylinder end closure 19. However, as will be explained below, this outlet acts only as a pressure relieving by-pass when the pump is required to handle large volumes of gas, as during initial pumping down toward high vacuum conditions or in the event of a surge of excess gas thereafter. The pump is capable of reaching high vacuum conditions in which gas outlets 30 become inoperative and gas is instead expelled from working space 33 of each unit via a gas transfer passage which extends longitudinally within the cylinder wall of that unit.

The gas transfer passage of unit 12 is seen in the right-hand side of FIG. 1 and is indicated by the numeral 81. One end of this passage 81 communicates with working space 33 via a port 82 and it extends at its other end to a set of ports 83 which open into the interior of the cylinder at such a position that they are uncovered to communicate with working space 34 as piston 16 approaches the top dead centre position. In the formation of port 83 a hole 84 must be drilled in cylinder portion 29 and subsequently closed off with a plug 85 and sealing "O"-ring 86. Port 82 may penetrate the inner face 52 of cylinder closure 19 to ensure that it is not blocked by the piston when the piston approaches the top dead centre position.

Differential piston face 27 acts to exhaust air from working space 34 via an exhaust duct 67 extended through cylinder wall portion 31 to the working space 34. Exhaust duct 67 may be fitted with a one-way valve 66 comprised of a valve plug 68 at the inner end of duct 67 and a valve biasing spring 69. However, as will be explained below exhaust duct 67 is connected to the air inlet of pumping unit 11 and by appropriate phasing of the two pistons of the pumping units 11, 12 it is possible to eliminate valve 66.

As mentioned above, cylinder end outlet 30 serves as a pressure relief by-pass only. It is connected together with exhaust duct 67 from working space 34 to the air inlet of pumping unit 11 and it comprises a member 38 fitted across the mouth of an opening 39 which extends through cylinder end closure 19. Opening 39 forms the inlet end of a gas transfer duct 40 extending out through member 38 and the interface between closure 19 and member 38 is sealed by an "O"-ring 41. A one-way valve 42 is disposed within the inlet end of the duct 40. This valve is comprised of an elastomeric valve plate or disc 48 biased by a helical valve spring 49 against a thin annular flange 51 formed in cylinder end closure 19 to project inwardly of passage 40 at the inner face 52 of cylinder closure 19. Spring 49 acts directly between member 38 and valve disc 48. The face of disc 48 which is presented to flange 51 has a central projecting boss portion to project within and to fill the space within the rim of flange 51 when valve 42 is closed.

Each pumping unit 11, 12 is provided with two sets of sealing rings which provide sliding seals between the respective piston and cylinder. The first set is constituted by five piston rings 53 fitted to the head portion 24 of the piston to slide in cylinder portion 29 and the second set is constituted by three further piston rings 54 fitted to the skirt portion 26 of the piston to slide within the cylinder portion 31.

The construction of piston rings 53 and the manner in which they are fitted to the piston is illustrated in FIGS. 2 and 3. Each ring 53 is of simple rectangular cross-section and is split so as to have two free end portions 56, 57 which fit together. Ring end portions 56, 57 are notched one to each side of the ring, i.e. end portion 56 has a notch 58 at one side of the ring and end portion 57 has a notch 59 at the other side of the ring, such that they overlap to form between them a radial interface 61 which extends circumferentially of the ring. Notches 58, 59 each extend across half the width of the ring so that radial interface 61 is disposed midway between the opposite sides of the ring. The ring ends come together at the radial interface 61 and they can slide relative to one another at this radial interface back and forth in the circumferential direction of the ring to permit limited expansion and contraction of the ring without destroying the circumferential continuity of the ring.

The head portion 24 of piston 16 is provided with five axially spaced circumferential grooves 62 within which the sealing rings 53 are located. The sealing rings are disposed around endless resilient expander rings 63 which are seated within channels 64 formed in the roots of grooves 62. Expander rings 63 are moulded in one piece and are of circular cross-section. They are a neat fit within channels 64, which are of rectangular cross-section. Channels 64 are narrower than grooves 62 and are disposed centrally of those grooves. Thus each expander ring 63 is positively located centrally of the respective sealing ring 53 and it covers the radial interface 61 of that sealing ring at the inner periphery of the sealing ring.

FIG. 3 is, in effect, a composite of three cross-sections indicated by the lines A—A, B—B, C—C in FIG. 2 showing the manner in which the expander rings 63 engage the respective sealing rings around their entire circumference including across the radial interface 61. It will be seen that the ring 63 presents a barrier to leakage across sealing ring 53 around its entire circumference, including across the split at the ends of the ring. Ring 63 thus serves the dual function of expanding sealing ring 53 outwardly against the cylinder wall and ensuring maximum sealing around the whole periphery of the sealing ring. It is found that because of their circular cross-section rings 63 can expand to take up wear of rings 53 without substantial alteration of the pressure on rings 53 throughout their service life.

To further decrease the possibility of leakage across the set of piston rings 53 the overlapped ends of the rings are successively staggered in the circumferential direction through 180° so as greatly to increase the potential leakage path across the rings via the split ends.

Sealing rings 53 may be formed of a polyimide resin filled with polytetrafluoroethylene or other suitable material or polytetrafluoroethylene rings filled with graphite powder, other carbonaceous material, molybdenum disulphide, bronze powder, glass fibre, polyimide resin or mixtures of these or similar materials. These materials can provide the correct balance of a low coefficient of friction, a not unduly high coefficient of expansion, low wear and reasonable thermal conductivity. The polyimide resin is preferred since it can withstand higher temperatures. Expander rings 63 may be formed as simple "O"-rings of neoprene or other suitable elastomer.

Sealing rings 54 fitted to the skirt portion 26 of piston 16 are similar to sealing rings 53. They are fitted within grooves in the piston and provided with internal neoprene expander rings in the same manner.

Pumping unit 11 is identical to unit 12 and it provides two backing stages for the unit 12 which provides two high vacuum stages. To achieve this the outlet 30 and exhaust duct 67 of unit 12 are connected, as indicated by broken lines in FIG. 1, to the intake 36' of unit 11 and the cylinder end outlet 30' and exhaust duct 67' of unit 12 are opened to atmosphere.

It will be appreciated that a certain gas pressure must be generated within working space 33 in order to open valve 42, this pressure being determined by the biasing force provided by the valve spring 49 and the vacuum condition in exhaust duct 40 created by the backing stage unit 11. The valve therefore constitutes a restriction to exhaustion of gas through exhaust passage 40. On the other hand, transfer passage 81, although relatively small compared with exhaust duct 40 is permanently unrestricted and, during the short part of the piston stroke during which port 83 is opened, it provides a preferential path for displacement of gas from working space 33 to working space 34.

When the pump is required to handle a large gas flow, as when initially pumping down to high vacuum conditions, the gas which enters the cylindrical working space 33 through the intake ports 37 is compressed to a pressure sufficient to cause valve 42 to open before piston 16 approaches the end of its forward stroke to open port 83. During such operation, the bulk of the gas is expelled via valve 42 and exhaust duct 30 into the fore-vacuum created by the backing stage pump unit 11. When the piston approaches the end of its forward stroke to open port 83 some of the residual gas will be displaced through passage 81 into working space 34. This can occur at a pressure lower than that required to open valve 41 and the latter valve may then close. As pumping proceeds, a stage is reached at which the amount of gas taken into working space 33 through intake ports 37 is so small that it cannot be compressed to a pressure sufficient to open valve 42 before the piston has reached the position at which port 83 is opened. At this stage of operation valve 42 remains closed and the only transfer of gas from working space 33 is via transfer duct 81 at pressures lower than would be necessary for exhaustion through outlet duct 30. In this way it is possible to generate a higher vacuum condition than could be achieved by exhaustion of gas through the valve. In arrangements where gas can be exhausted only through a valve, the vacuum which can be achieved will be limited by the extent to which the valve can operate reliably at extremely light spring pressures whereas the arrangement of the present invention eliminates this limitation and valve spring 49 can be strong enough to provide reliable valve operation.

With the arrangement of the present invention, the limitations on the vacuum which can be achieved are determined mainly by the extent to which gas can be caused to pass rapidly from transfer duct 81 into working space 34 at the end of the forward stroke of the piston and without flowing backwardly before port 83 is re-closed at the start of the back stroke of the piston. This demands that the total volume of transfer passage 81 be very small compared with the piston swept volume of working space 33 in order to achieve a high compression ratio, since transfer passage 81 constitutes an unswept "dead space" in permanent communication with working space 33. In order to achieve vacuums significantly lower than could be achieved with exhaustion through spring loaded valves, the volume of transfer passage 81 should be not more than 5% of the piston swept volume of working space 33.

In order to avoid significant back flow of gas into transfer passage 81 port 83 must remain open only during a very short part of the stroke of the piston. More specifically it should remain closed except for back and forth movements of the piston through less than 5% of the stroke of the piston at the end of the piston forward stroke. Moreover, port 83 is not at any stage completely uncovered. It provides the required degree of communication with working space 34 when the trailing edge of the rearmost piston ring 53 passes across it at which stage compressed gas in transfer passage 81 escapes into working space 34 via the small clearance space between the piston and the cylinder immediately behind that ring. The rear part of the piston behind the rearmost ring continues to cover port 83 even when the piston reaches the top dead centre position. This rearpart of the piston may be slightly relieved to allow adequate gas flow.

The operation of the backing stage unit 11 is similar to that of unit 12. Outlet 30' of the backing stage is operative only when that stage is required to handle large gas flows. At other times gas is expelled from the cylindrical working space of unit 11 solely via the cylinder wall transfer passage to the annular working space whence it is pumped by the differential piston face to atmosphere via the respective exhaust duct 67'. Because the pistons of the two pumping units are reciprocated in opposite phase the air intake ports of unit 11 will be open only during the pumping stroke of the differential piston face of unit 12 and the one-way valve 66 in exhaust duct 67 of unit 12 may be omitted but the exhaust duct to unit 11 must, of course, be fitted with such a valve.

Typically, a pump as illustrated in FIGS. 1 to 3 may be constructed in accordance with the following:

| | |
|---|---|
| Diameters of cylindrical working spaces | 10.0 cm |
| | 5.5 cm |
| Piston stroke | 2.7 cm |
| Swept volumes of cylindrical working spaces | 212 cc |
| | 148 cc |
| Diameter of transfer passages 81 | 0.2 cm |
| Volume of transfer passages 81 | 0.14 cc |
| Part of piston stroke during which port 83 is opened | 4% |

It has been found that a pump of the above dimensions run at a speed of about 400 strokes per minute can be operated quite satisfactorily without the need for any piston lubrication and will maintain a pressure of less than 0.030 Torr of permanent gases.

FIG. 4 illustrates an alternative form of piston 104 which may be fitted to a pump otherwise constructed generally in accordance with FIGS. 1 to 3. This piston is provided with an alternative sealing ring arrangement also constructed in accordance with the present invention. Piston 104 is of stepped configuration. More particularly, it has a relatively large diameter head portion 105 and a smaller diameter portion 106 so that an annular piston face 107 is defined at the rear of the head portion directed oppositely to the main piston face 108. The piston is hollow, being comprised of a stepped tubular shell closed at one end by a plate 109 defining the front piston face 108 of the piston head. The other end of the piston shell is fitted with a tongue 111 drilled with a hole 112 for connection to the respective connecting rod of the pump.

Piston head 105 is fitted with three piston rings 113, 114, 115 and piston portion 106 if fitted with a pair of rings 110. All of these rings may be constructed of the materials previously specified for the split-type rings 53. The construction of piston rings is shown in FIG. 5. Each is formed as a circumferentially continuous ring having an inner cylindrical periphery 116 and an outer generally cylindrical peripheral surface 117. Adjacent outer peripheral surface 117 an annular groove 119 is formed in one side of the ring to divide the ring into an inner portion 120 and an outer peripheral skirt portion 121 which is integrally connected to the inner portion in the region of the root 122 of groove 119. The thickness of skirt 121 in the vicinity of its integral connection with the inner ring portion 116 is small enough to permit skirt to flex laterally of groove 119, i.e. to move in and out radially of the ring.

Although outer peripheral surface 117 of the ring is generally cylindrical it does have a slight taper from one side of the ring to the other. Specifically, the ring has a maximum outer diameter at one side and a minimum outside diameter at the other side and the outer peripheral surface 117 tapers conically between these two diameters. The diameter of the smaller end of the ring is chosen to be slightly smaller than the diameter of the cooperating cylinder and the diameter of the larger end is slightly greater than the cylinder diameter so that the skirt portion 121 of the piston ring must flex radially of the ring to permit the piston to enter the cylinder. This radial flexure ensures that there is continuous circumferential contact between the cylinder and the piston ring.

The outer peripheral wall 124 of groove 119 is aligned with the tapered outer peripheral surface 117 of the ring so that skirt portion 121 is substantially of constant thickness. More particularly the peripheral walls of the groove converge toward the root 122 so that in cross-section the groove is generally V-shaped but with a rounded root. The groove is filled with a body of elastomeric material 126. This material is retained in the groove in a compressed condition and it therefore biases the skirt portion 121 radially outwardly of the ring. Because in a vacuum pump there is no gas pressure to expand the piston rings as in the case of an internal combustion engine, it is desirable to provide such a mechanical biasing means to bias the skirt outwardly against the cylinder wall and completely filling the groove with an elastomeric material is preferred since this reduces the volume which needs to be evacuated. However, other biasing means such as a simple expansion spring could be used. It would also be possible to have a composite biasing means formed by a biasing spring embedded within a plug or ring of elastomeric material. The elastomeric material must be capable of withstanding high temperatures of operation and it is found that silicone rubber is particularly suitable.

When the temperature of the ring increases during service, the ring will expand appreciably since bronze loaded teflon has a high coefficient of thermal expansion. However this simply compresses the elastomer which is free to bulge outwardly at the mouth of the groove and the loading of skirt 121 on the cylinder wall will remain substantially constant for all operating conditions of the pump.

Piston rings 110 are separated by a spacer ring 131 and held by a clamping ring 132 which is internally screw threaded and screwed onto an external screw thread at the end of piston portion 106. One of the rings is sandwiched between spacer ring 131 and clamp ring 132 and the other is sandwiched between the spacer ring 131 and a radial shoulder face 133 on piston portion 106. A groove 134 in piston shoulder face 133 receives a resilient O-ring 135 and similar grooves 136, 137 in the ends of spacer ring 131 receive O-rings 138, 139. O-rings 135, 136, 137 are compressed against the respective side faces of piston rings 110 to provide seals against leakage of gas behind the piston rings.

Piston rings 113, 114, 115 are constructed in identical manner to piston rings 110 except that they are of larger diameter to suit the diameter of piston head 105 and the inner portions of rings 113, 114 are rebated to register with components which clamp them to the piston. Specifically, piston ring 113 is rebated at 141 to register with the outer margin of piston head plate 109 which is clamped to the hollow shell of the piston by clamping screws 142 to hold piston ring 113 in position against an annular shoulder face of the piston. A resilient 0-ring 144 is fitted within an annular groove 145 in piston face 143 so as to be compressed between the piston and piston ring 113 and so seal against leakage of gas behind the piston ring. Piston rings 114 and 115 are separated by a spacer ring 140 which is rebated to receive sealing 0-rings 150 which are compressed against the two piston rings and the piston. A sealing 0-ring 146 is mounted in a groove 147 in the end face of the piston shell so as to be compressed between the piston shell and head plate 109.

Piston ring 114 is rebated at 148 to register with the outer margin of a clamping ring 149 which fastened to the piston shell by fastening screws 151 so as to clamp piston ring 114, spacer ring 140 and piston ring 115 in position and to compress sealing rings 150.

FIG. 6 illustrates a further type of piston ring fitted with a modified means for expanding that ring outwardly against the cylinder. The piston ring is denoted as 200 and it is generally similar to the previous rings 113, 114, 115 in that it is formed as a circumferentially continuous ring having an inner cylindrical periphery 201, a generally cylindrical, but slightly tapered, outer peripheral surface 202 and an annular groove 203 formed in one side of the ring to divide the ring into an inner portion 204 and an outer peripheral skirt portion 205 which is integrally connected to the inner portion in the region of the root 206 of the groove. In this case, however, the skirt portion 205 of the ring is biased outwardly against the cylinder by a resilient expander ring 207 which is transversely split at 208 in the same manner as a conventional automobile piston ring. Expander ring 207 is backed by an inner ring 209 of elastomeric packing material.

FIG. 7 illustrates a further type of ring 211 which operates in a similar fashion to the ring of FIG. 5 but it has an elastomer-filled circumferential groove in each of its side faces so as to have two oppositely directed, flexible outer skirt portions which are biased outwardly against the cylinder wall. It has an outer peripheral groove 212 mid-way between its side faces to enhance the flexibility of the two skirt portions.

The illustrated pump provides four successive pump stages in a most compact and effective arrangement. Specifically, each cylinder provides two stages and pumping through these stages is achieved by a single moving piston. This permits the gas transfer passage to be formed directly in the cylinder wall and accurate phasing of the opening and closing of the gas transfer port to the lower vacuum stage relative to the movement of the piston face in the higher vacuum stage. Moreover, the differential piston arrangement, in creating a vacuum behind the piston rings, minimizes leakage of gas into the higher vacuum stage and with the provision of piston rings of the illustrated type such leakage can be successfully reduced to insignificant levels while maintaining oil-free operation of the pump. However, this particular pump has been advanced by way of example only and it is to be understood that the invention is in no way limited to the details of its construction and that many modifications and variations could be made without departing from the scope of the appended claims.

We claim:

1. A vacuum pump comprising:
   a cylinder having a first portion closed at one end and a second portion contiguous with, but of smaller diameter than, the first portion;
   a piston having a head portion slidable in the first cylinder portion and a second piston portion of smaller diameter than the head portion and slidable in the second cylinder portion, said piston head portion having a front face facing the closed cylinder end and an annular back face;
   a gas inlet for inlet of gas to the interior of the first cylinder portion between the front face of the piston head portion and the closed cylinder end on reciprocation of the piston;
   a first exhaust duct for exhaustion of gas from the interior of the first cylinder portion ahead of the piston head portion by pumping action of the front face of the piston head portion;
   a one-way valve in said first exhaust duct operable by gas pressure thereon to permit exhaustion of gas from the interior of the first cylinder portion ahead of the piston head portion but closable against reverse gas flow;
   an exhaust means for exhaustion of gas from the interior of the first cylinder portion behind the piston head portion by pumping action of the back face of the piston head portion; and
   a gas transfer passage for transfer of gas from said interior of the first cylinder portion ahead of the piston head portion to the interior of the first cylinder portion behind the piston head portion by pumping action of the front face of the piston head which gas transfer passage is capable of said transfer of gas at gas pressures lower than required to open said one way valve.

2. A vacuum pump as claimed in claim 1, wherein the one-way valve in the first exhaust duct is subject to the gas pressure within the interior of the first cylinder portion ahead of the piston head portion throughout all movements of the piston.

3. A vacuum pump as claimed in claim 2, wherein the first exhaust duct communicates with the interior of the first cylinder portion ahead of the piston head portion through said one end of the cylinder.

4. A vacuum pump as claimed in claim 3, wherein the piston closely abuts the closed end of the cylinder at the end of a forward stroke.

5. A vacuum pump as claimed in claim 3, wherein the first exhaust duct is provided at said one end of the cylinder with an inwardly projecting peripheral flange which defines within its inner edge a duct inlet opening, said one-way valve comprises a resilient valve plate disposed within the duct and biasing means to bias the plate against the flange, the plate being such as to fill the duct inlet opening, and the piston closely abuts the closed end of the cylinder and said valve plate at the end of a forward stroke.

6. A vacuum pump as claimed in claim 1, wherein the gas transfer passage is a permanently unrestricted passage which communicates at one end with said interior of the first cylinder portion at the closed end of that cylinder portion and communicates at its other end with a port located in the cylinder wall such that it is closed by the piston against escape of gas from the transfer passage into the first cylinder portion behind the piston head portion except when the piston is closely adjacent the closed cylinder end when it provides communication with the first cylinder portion behind the piston head portion.

7. A vacuum pump as claimed in claim 6, wherein the gas transfer passage is formed in the cylinder wall.

8. A vacuum pump as claimed in claim 6, wherein the total volume of the transfer passage is less than 5% of the piston swept volume of the first cylinder portion ahead of the piston head portion.

9. A vacuum pump as claimed in claim 6, wherein said port is closed by the piston against transfer of gas therethrough except for back and forth movements of the piston through less than 5% of the stroke of the piston at the end of the piston forward stroke.

10. A vacuum pump as claimed in claim 6, wherein the piston head portion is fitted with a plurality of sealing rings slidable in the first cylinder portion and said port is opened by passage of the rearmost sealing ring across it for escape of gas from the transfer passage into the first cylinder portion behind the piston head portion which escaping gas must pass between the cylinder and the rear part of the piston behind the rearmost sealing ring.

11. A vacuum pump as claimed in claim 10, wherein said port remains covered by said rear part of the piston at the end of the forward stroke of the piston.

12. A vacuum pump as claimed in claim 1, wherein the piston is fitted with a plurality of sealing rings slidable in the cylinder and, wherein at least one of the sealing rings is split so as to have two free ends which fit together, said free ends are notched one to each side of the ring such that they overlap to form between them an interface extending circumferentially of the ring and the ring is expanded outwardly by means of an endless resilient expander ring disposed within the sealing ring and covering the inner radial extremity of said interface.

13. A vacuum pump as claimed in claim 12, wherein said interface is a radial interface disposed midway between opposite sides of the sealing ring.

14. A vacuum pump as claimed in claim 12, wherein the sealing ring is seated in a circumferential groove in the piston and said expander ring is located in a circumferential channel formed in the root of the groove.

15. A vacuum pump as claimed in claim 12, wherein said one sealing ring and the expander ring are fitted to the head portion of the piston.

16. A vacuum pump as claimed in claim 1, wherein the piston is fitted with a plurality of sealing rings slidable in the cylinder and wherein at least one of said sealing rings is formed as a circumferentially continuous ring having a generally cylindrical outer peripheral surface and, adjacent that outer surface, an annular groove in one side of the ring to divide the ring into an inner portion and an outer peripheral skirt portion which is integrally connected to the inner portion at the root of the groove and is capable of flexure laterally of the groove to promote circumferentially continuous contact with the cylinder.

17. A vacuum pump as claimed in claim 16, wherein the outer peripheral surface of said one sealing ring, although generally cylindrical, is tapered in the direction from one side of the ring to the other.

18. A vacuum pump as claimed in claim 17, wherein said one sealing ring has at one side an external diameter greater than the internal diameter of that part of the cylinder in which it slides and at the other side an external diameter less than said internal diameter.

19. A vacuum pump as claimed in claim 17, wherein the outer peripheral wall of the groove is aligned with the outer peripheral surface of the ring so that the skirt portion is of substantially constant thickness.

20. A vacuum pump as claimed in claim 16, wherein said groove contains biasing means acting on the skirt portion of said sealing ring to bias it radially outwardly against the cylinder.

21. A vacuum pump as claimed in claim 20, wherein said biasing means comprises a body of an elastomeric material substantially filling the groove and retained therein in a state of compression.

22. A vacuum pump as claimed in claim 20, wherein said biasing means comprises a resilient element disposed within the groove and acting radially outwardly on said skirt portion.

23. A vacuum pump as claimed in claim 16, wherein said one sealing ring is fitted to said second portion of the piston to slide within the second cylinder portion.

* * * * *